United States Patent
Heikkilä

(10) Patent No.: US 11,537,116 B2
(45) Date of Patent: Dec. 27, 2022

(54) MEASUREMENT RESULT ANALYSIS BY ANOMALY DETECTION AND IDENTIFICATION OF ANOMALOUS VARIABLES

(71) Applicant: Elisa Oyj, Helsinki (FI)

(72) Inventor: Rasmus Heikkilä, Helsinki (FI)

(73) Assignee: Elisa Oyj, Helsinki (FI)

( * ) Notice: Subject to any disclaimer, the term of this patent is extended or adjusted under 35 U.S.C. 154(b) by 0 days.

(21) Appl. No.: 17/776,796

(22) PCT Filed: Nov. 9, 2020

(86) PCT No.: PCT/FI2020/050739
§ 371 (c)(1),
(2) Date: May 13, 2022

(87) PCT Pub. No.: WO2021/099678
PCT Pub. Date: May 27, 2021

(65) Prior Publication Data
US 2022/0350323 A1   Nov. 3, 2022

(30) Foreign Application Priority Data

Nov. 19, 2019 (FI) ..................................... 20195989

(51) Int. Cl.
*G05B 23/02* (2006.01)

(52) U.S. Cl.
CPC ..... *G05B 23/0243* (2013.01); *G05B 23/0221* (2013.01)

(58) Field of Classification Search
None
See application file for complete search history.

(56) References Cited

U.S. PATENT DOCUMENTS

| | | |
|---|---|---|
| 10,432,652 B1 | 10/2019 | Yona et al. |
| 2010/0198556 A1 | 8/2010 | Kost |
| 2012/0310597 A1 | 12/2012 | Uchiyama et al. |

(Continued)

FOREIGN PATENT DOCUMENTS

| | | |
|---|---|---|
| EP | 3376446 A1 | 9/2018 |
| WO | 2017086963 A1 | 5/2017 |

OTHER PUBLICATIONS

Finnish Patent and Registration Office, Search Report, Application No. 20195989, dated Jun. 18, 2020, 2 pages.

(Continued)

*Primary Examiner* — Carlos R Ortiz Rodriguez
(74) *Attorney, Agent, or Firm* — Ziegler IP Law Group, LLC

(57) ABSTRACT

A computer implemented method of analyzing measurement results of a target system, such as an industrial process or communication network. The method includes receiving a data sample with a plurality of variables representing the measurement results, detecting that the data sample is an anomalous sample using an anomaly detection model, processing the data sample by applying an imputation model to selected subsets of variables of the data sample to obtain imputed samples, and applying the anomaly detection model to the imputed samples, determining anomalous variables of the data sample based on results from the processing of the data sample, and outputting the anomalous variables of the data sample for management operations in the target system.

10 Claims, 5 Drawing Sheets

(56) References Cited

U.S. PATENT DOCUMENTS

| | | |
|---|---|---|
| 2019/0260778 A1 | 8/2019 | Chen et al. |
| 2019/0310617 A1 | 10/2019 | Li et al. |

OTHER PUBLICATIONS

Notification of Transmittal of The International Search Report and the Written Opinion of The International Searching Authority, or The Declaration, Application No. PCT/FI2020/050739, dated Jan. 27, 2021, 12 pages.

O'reilly et al, "Anomaly Detection in Wireless Sensor Networks in a Non-Stationary Environment", IEEE Communication Surveys & Tutorials, Third Quarter 2014, vol. 16, No. 3, pp. 1413-1432, DOI: 10.1109/SURV.2013.112813.00168, 20 pages.

MEASUREMENT RESULT ANALYSIS BY ANOMALY DETECTION AND IDENTIFICATION OF ANOMALOUS VARIABLES

TECHNICAL FIELD

The present application generally relates to analysis of measurement results and more particularly to performing measurement result analysis by using anomaly detection and identification of anomalous variables. Furthermore, the present application relates to using disclosed analysis of measurement results for example in management of industrial processes or in management of communication networks.

BACKGROUND

This section illustrates useful background information without admission of any technique described herein representative of the state of the art.

Anomaly detection refers to identification of data points, items, observations, events or other variables that do not conform to an expected pattern of a given data sample or data vector. There are various statistical methods that can be used in anomaly detection. Such methods include for example principal component analysis (PCA), independent component analysis, autoencoder, one-class support vector machine, clustering methods, and others.

Anomaly detection models can be trained to learn the structure of normal data samples. The models output an anomaly score for an analysed sample, and the sample is classified as an anomaly, if the anomaly score exceeds some predefined threshold. Typically, only a subset of variables of the data sample cause the anomaly. That is, some variables remain non-anomalous or normal, while some exhibit anomalous behavior. The challenge is then to identify the variables that exhibit anomalous behavior and thus cause the anomaly. For example, a PCA model fails to adequately reconstruct abnormal data samples, which is utilized to detect the occurrence of an anomaly, but the PCA model does not in itself indicate the anomalous variables.

Contribution analysis method aims at identifying the anomalous variables in a given anomalous sample by decomposing the anomaly score into contributions of the variables. Variables with larger contributions can be defined to be the anomalous variables. The drawback in contribution analysis method is that it exploits the structure of principal component analysis (PCA) models and therefore cannot be used with other anomaly detection models. Additionally, the result can be ambiguous as the decomposition can be performed in multiple ways. Still further, performance of the contribution analysis method is mediocre, since due to the dimensionality reduction of the PCA model, anomalous variables influence the contributions of non-anomalous variables, which can lead to misidentification of anomalous variables.

SUMMARY

Various aspects of examples of the invention are set out in the claims. Any devices and/or methods in the description and/or drawings which are not covered by the claims are examples useful for understanding the invention.

According to a first example aspect of the present invention, there is provided a computer implemented method of analyzing measurement results of a target system. The method comprises receiving a data sample comprising a plurality of variables representing the measurement results, detecting that the data sample is an anomalous sample using an anomaly detection model, processing the data sample by applying an imputation model to selected subsets of variables of the data sample to obtain imputed samples, and applying the anomaly detection model to the imputed samples, determining anomalous variables of the data sample based on results from the processing of the data sample, and outputting the anomalous variables of the data sample for management operations in the target system.

The target system may be an industrial process, and in an embodiment, the measurement results comprise sensor data from the industrial process.

In another embodiment, the target system is a communication network including devices of a physical network infrastructure. The measurement results may comprise performance metrics from the communication network.

In an embodiment, the method comprises performing the processing of the data sample using an exhaustive algorithm. The exhaustive algorithm comprises separately applying the imputation model to a plurality of selected subsets of variables of the data sample to obtain a plurality of imputed samples comprising imputed variables, applying the anomaly detection model to the imputed samples to obtain respective anomaly scores, selecting the imputed sample with lowest anomaly score, and choosing the imputed variables of the selected imputed sample as the anomalous variables of the data sample.

In an embodiment, the subsets of the variables are preselected based on the target system.

In an embodiment, the method comprises performing the processing of the data sample using a greedy algorithm. The greedy algorithm comprises separately imputing individual variables of the data sample using the imputation model to obtain a plurality of imputed samples comprising an imputed variable, applying the anomaly detection model to the imputed samples to obtain respective anomaly scores, selecting the imputed sample with lowest anomaly score and freezing value of an associated imputed variable, repeating the imputing, applying and selecting phases for the variables with unfrozen values until anomaly score of the selected imputed sample ceases to indicate anomaly; and choosing the variables with a frozen value as the anomalous variables of the data sample.

In an embodiment, a combination of the exhaustive and the greedy algorithms is used. For example, the exhaustive and the greedy algorithm may be used consecutively.

According to a second example aspect of the present invention, there is provided an apparatus comprising a processor and a memory including computer program code; the memory and the computer program code configured to, with the processor, cause the apparatus to perform the method of the first aspect or any related embodiment. According to a further example aspect there is provided an apparatus comprising means for performing the method of the first aspect or any related embodiment.

According to a third example aspect of the present invention, there is provided a computer program comprising computer executable program code which when executed by a processor causes an apparatus to perform the method of the first aspect or any related embodiment.

The computer program of the third aspect may be a computer program product stored on a non-transitory memory medium.

Different non-binding example aspects and embodiments of the present invention have been illustrated in the foregoing. The embodiments in the foregoing are used merely to explain selected aspects or steps that may be utilized in implementations of the present invention. Some embodiments may be presented only with reference to certain example aspects of the invention. It should be appreciated that corresponding embodiments may apply to other example aspects as well.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION OF THE DRAWINGS

Example embodiments of the present invention and its potential advantages are understood by referring to FIGS. 1 through 4 of the drawings. In this document, like reference signs denote like parts or steps.

Example embodiments of the invention provide analysis of measurement results based on using anomaly detection and identification of anomalous variables in a given anomalous sample. That is, the purpose is to identify which variable in an anomalous sample causes the anomaly. Embodiments of the invention can be used in the context of management of industrial processes or management of communication networks.

According to an example embodiment of the invention, an anomalous data sample is first detected using a selected anomaly detection model such as one of: principal component analysis (PCA), independent component analysis, autoencoder, one-class support vector machine, clustering methods, and other anomaly detection models. Any detected anomalous samples are then iteratively processed using a selected imputation model and the anomaly detection model to identify the anomalous variables in the analyzed sample. In general, an imputation model is a model that predicts, for a given data sample with missing elements, the values of the missing elements based on the values of non-missing elements. The imputation model may be for example one of: regression-based imputation, denoising autoencoder, probabilistic models and other imputation models.

Example embodiment suit well for analyzing measurement result samples comprising a plurality of variables. For example, data samples comprising more than 10 variables may be challenging to analyze manually. In many practical implementations of industrial processes and communication networks, significantly larger data samples may need to be analyzed. In the context of industrial processes, the variables of the data samples may involve sensor data and/or performance metrics such as pressure, temperature, manufacturing time, yield of a production phase etc. In the context of communication networks, the variables of the data samples may involve sensor data and/or performance metrics such as key performance indicator values, signal level, number of users, number of dropped connections etc.

Figure 1:
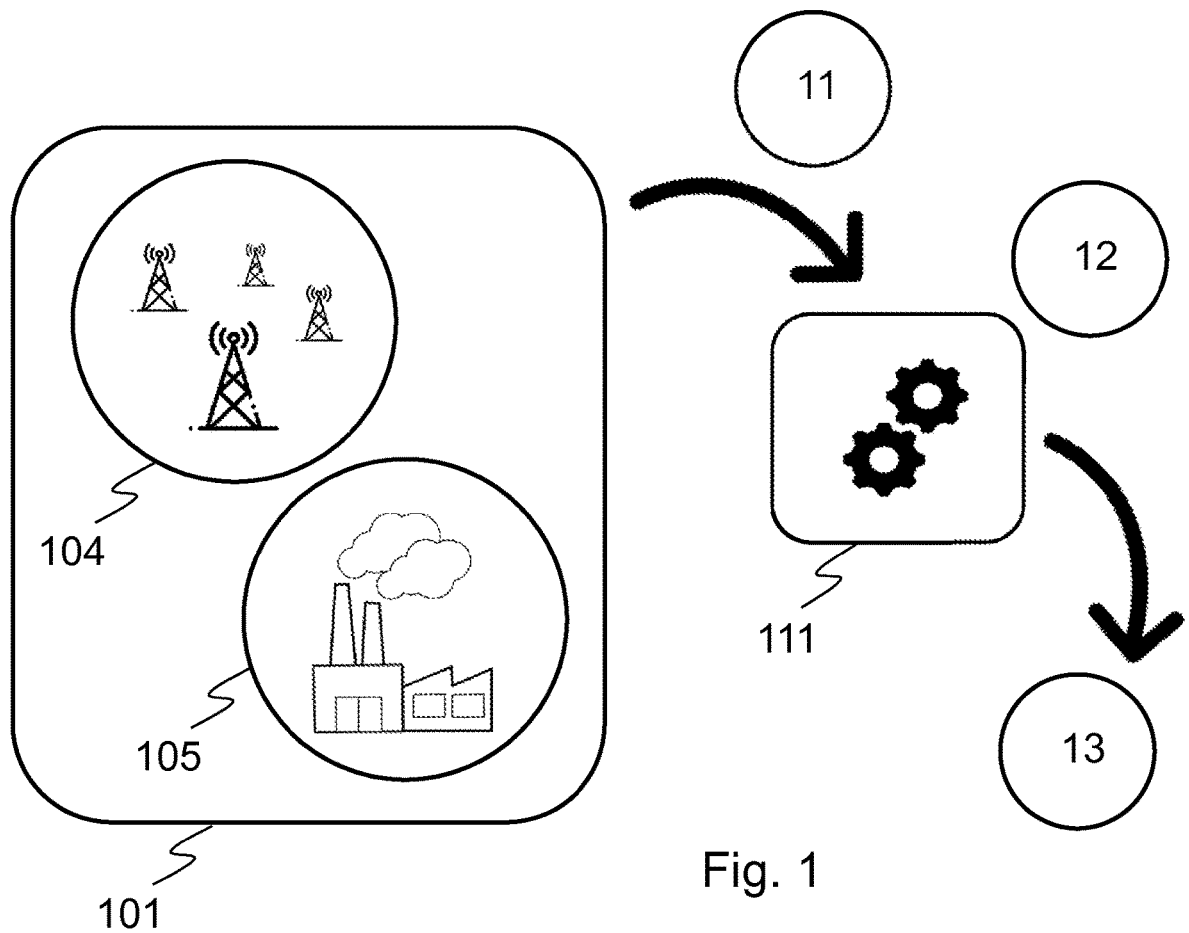
FIG. 1 shows an example scenario according to an embodiment.

FIG. 1 shows an example scenario according to an embodiment. The scenario shows a controllable target system 101 and an automation system 111 configured to implement analysis of measurement results according to example embodiments. The target system 101 may be a communication network 104 comprising a plurality of physical network sites comprising base stations and other network devices, or the target system 101 may be an industrial process 105.

In an embodiment of the invention the scenario of FIG. 1 operates as follows: In phase 11, the automation system 111 receives data samples from the target system 101. In general, the data samples concern measurement results from the target system 101.

In phase 12, the automation system 111 analyzes the data samples, detects anomalous samples and identifies anomalous variables in a given anomalous sample.

In phase 13, the automation system 111 outputs the detected anomalous sample and respective anomalous variables. This output may then be used as a basis for further actions for example in management of or changes in the target system 101.

It is to be noted that mainly analysis of a single data sample is discussed in this disclosure, but multiple data samples may be analysed in parallel. The analysis may be manually or automatically triggered. Additionally or alternatively, the analysis may run continuously or the analysis may be performed whenever data samples are available.

Figure 2:
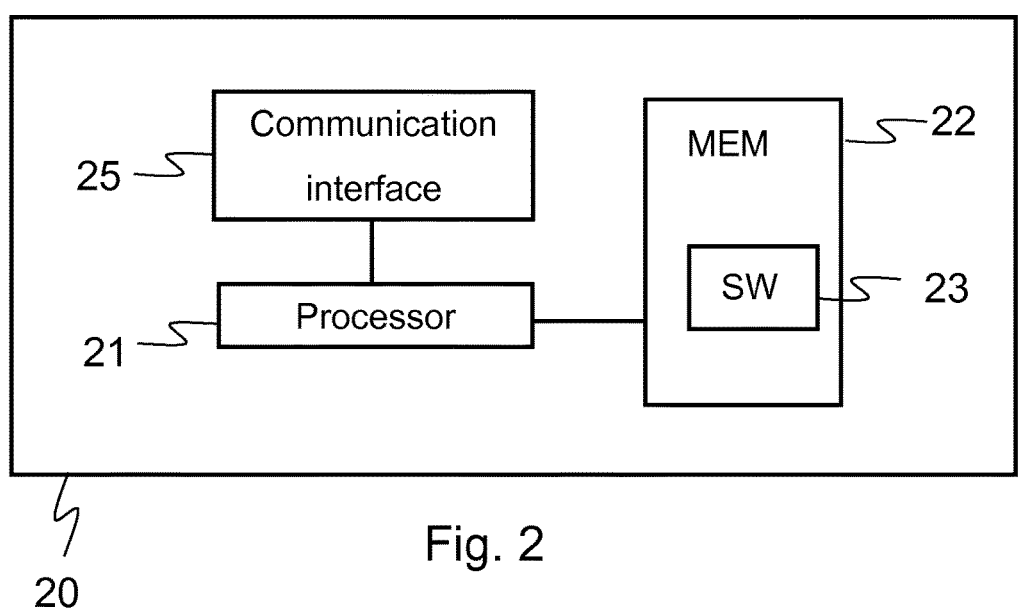
FIG. 2 shows an apparatus according to an embodiment.

FIG. 2 shows an apparatus 20 according to an embodiment. The apparatus 20 is for example a general-purpose computer or server or some other electronic data processing apparatus. The apparatus 20 can be used for implementing embodiments of the invention. That is, with suitable configuration the apparatus 20 is suited for operating for example as the automation system 111 of foregoing disclosure.

The general structure of the apparatus 20 comprises a processor 21, and a memory 22 coupled to the processor 21. The apparatus 20 further comprises software 23 stored in the memory 22 and operable to be loaded into and executed in the processor 21. The software 23 may comprise one or more software modules and can be in the form of a computer program product. Further, the apparatus 20 comprises a communication interface 25 coupled to the processor 21.

The processor 21 may comprise, e.g., a central processing unit (CPU), a microprocessor, a digital signal processor (DSP), a graphics processing unit, or the like. FIG. 2 shows one processor 21, but the apparatus 20 may comprise a plurality of processors.

The memory 22 may be for example a non-volatile or a volatile memory, such as a read-only memory (ROM), a programmable read-only memory (PROM), erasable programmable read-only memory (EPROM), a random-access memory (RAM), a flash memory, a data disk, an optical storage, a magnetic storage, a smart card, or the like. The apparatus 20 may comprise a plurality of memories.

The communication interface 25 may comprise communication modules that implement data transmission to and from the apparatus 20. The communication modules may comprise, e.g., a wireless or a wired interface module. The wireless interface may comprise such as a WLAN, Bluetooth, infrared (IR), radio frequency identification (RF ID), GSM/GPRS, CDMA, WCDMA, LTE (Long Term Evolution) or 5G radio module. The wired interface may comprise such as Ethernet or universal serial bus (USB), for example.

Further the apparatus 20 may comprise a user interface (not shown) for providing interaction with a user of the apparatus. The user interface may comprise a display and a keyboard, for example. The user interaction may be implemented through the communication interface 25, too.

A skilled person appreciates that in addition to the elements shown in FIG. 2, the apparatus 20 may comprise other elements, such as displays, as well as additional circuitry such as memory chips, application-specific integrated circuits (ASIC), other processing circuitry for specific purposes and the like. Further, it is noted that only one apparatus is shown in FIG. 2, but the embodiments of the invention may equally be implemented in a cluster of shown apparatuses.

Figure 3A:
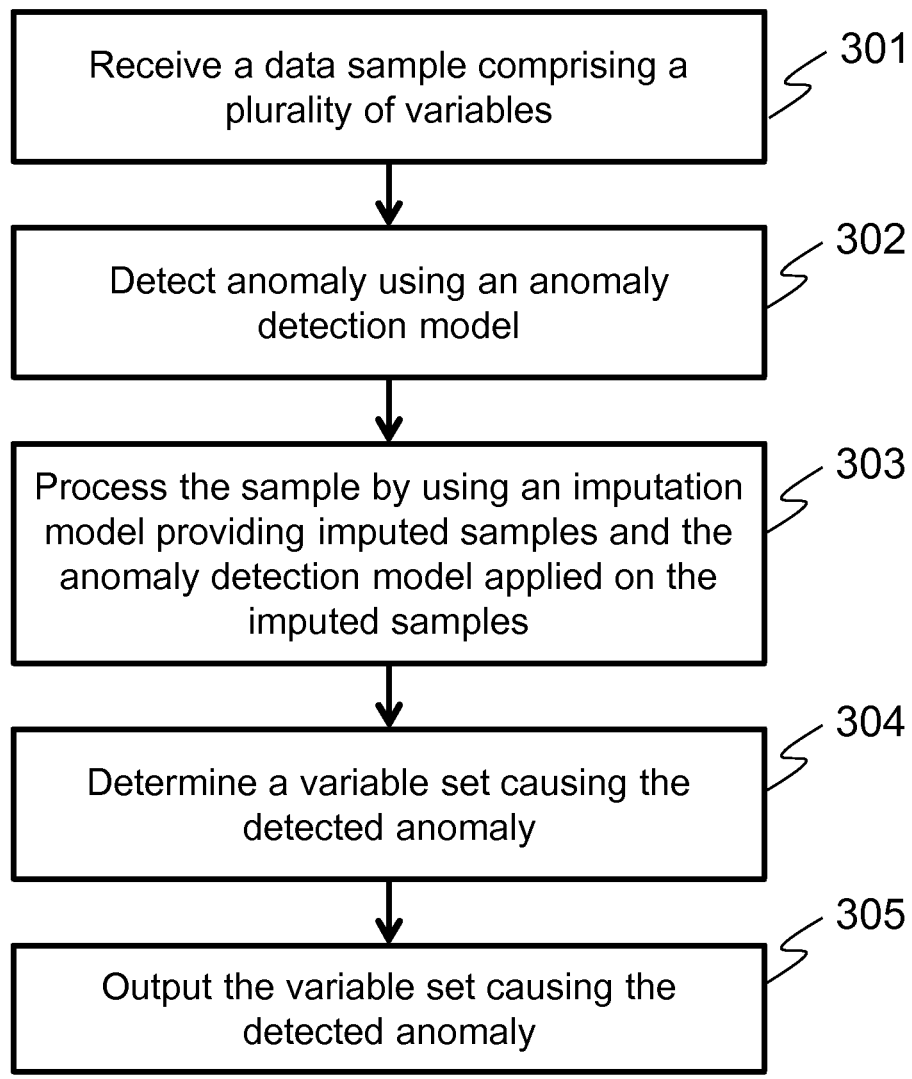
FIGS. 3A-3C show flow diagrams illustrating example methods according to certain embodiments.
Figure 3B:
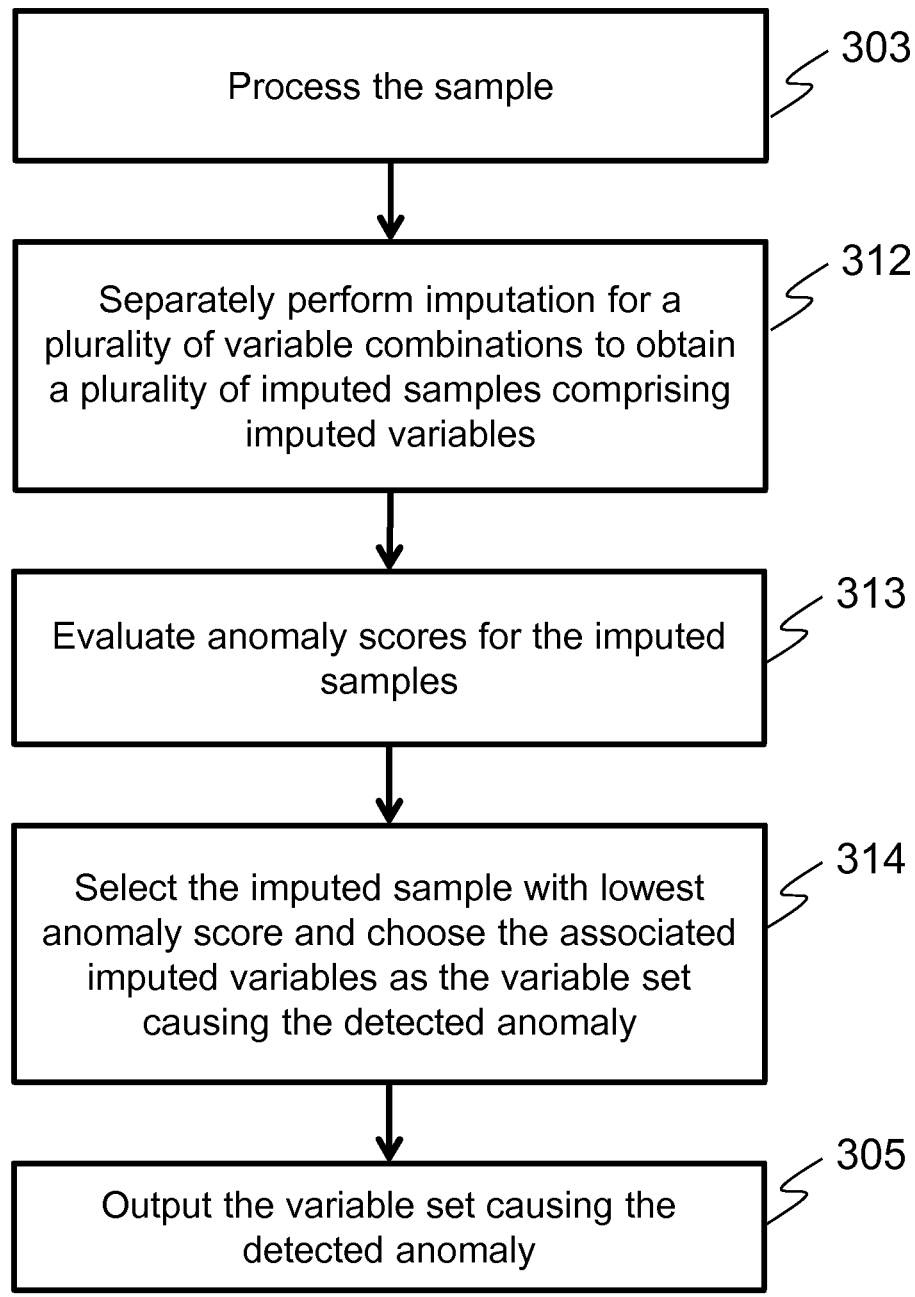
Figure 3C:
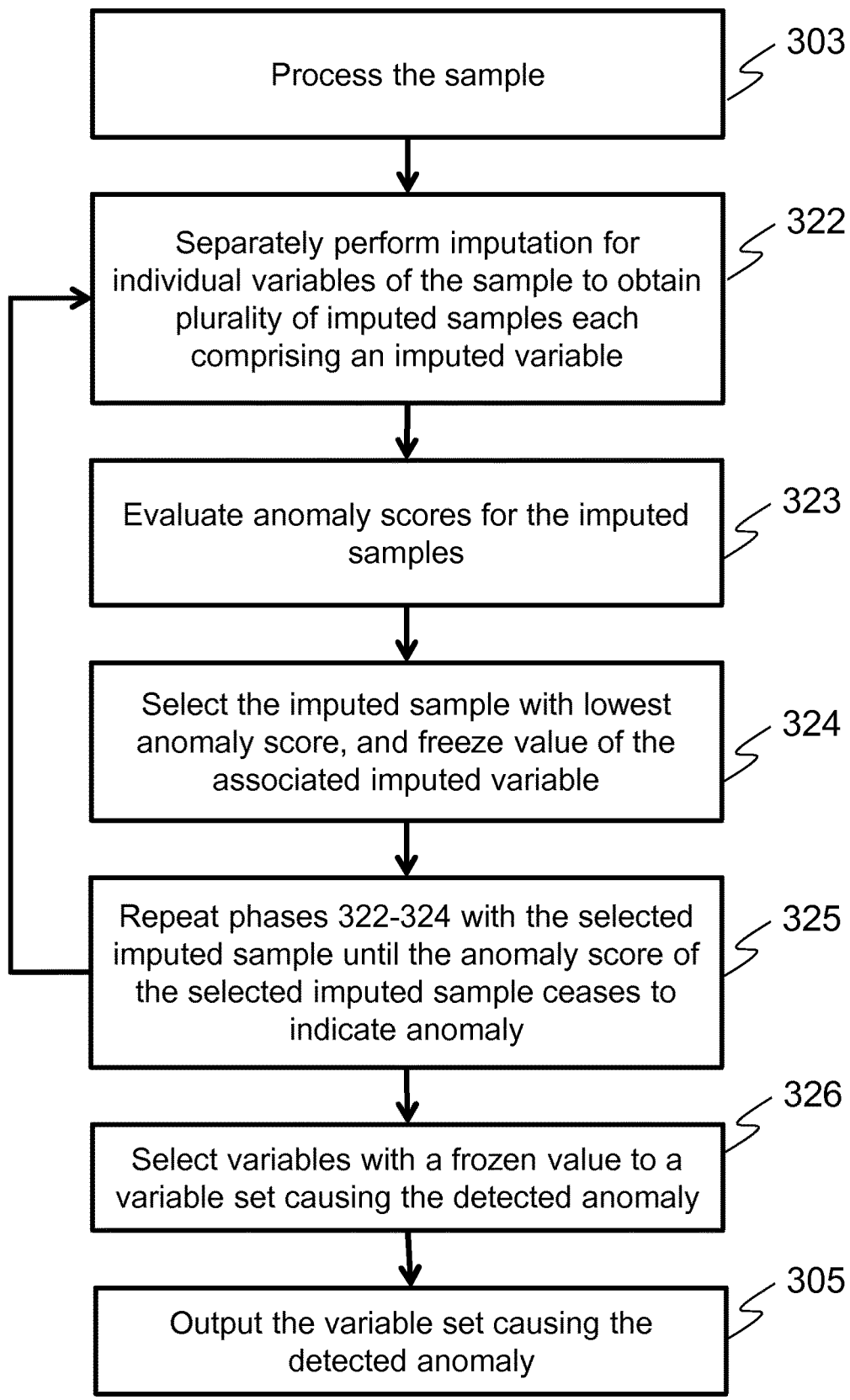

FIGS. 3A-3C 3B show flow diagrams illustrating example methods according to certain embodiments. The methods may be implemented in the automation system 111 of FIG. 1 and/or in the apparatus 20 of FIG. 2. The methods are implemented in a computer and do not require human interaction unless otherwise expressly stated. It is to be noted that the methods may however provide output that may be further processed by humans and/or the methods may require user input to start. Different method phases may be combined with each other and the order of phases may be changed expect where otherwise explicitly defined. Furthermore, it is to be noted that performing all phases of the flow charts is not mandatory.

The method of FIG. 3A comprises following phases:

Phase 301: A data sample is received. The data sample comprises a plurality of variables representing measurement results from a target system.

Phase 302: An anomaly is detected. That is, an anomaly detection model is applied to the received data sample and responsively it is detected that the data sample is an anomalous sample. E.g. an anomaly score produced by the model exceeds a threshold set for an anomaly. It is to be noted that if anomaly is not detected, the received data sample does not need to be processed any further.

Phase 303: The data sample is processed by using an imputation model and the anomaly detection model. The imputation model is applied to selected subsets of variables of the data sample to obtain imputed samples, and the anomaly detection model is applied to the imputed samples. More detailed example embodiments involving the use of the imputation model and the anomaly detection model are discussed in connection with FIGS. 3B and 3C.

Phase 304: Anomalous variables of the data sample are determined based on results from the processing of the data sample in phase 303. That is, responsive to the results of the processing phase 303, it is determined what was the variable set that caused the anomaly detected in phase 302.

Phase 305: The determined anomalous variables of the data sample are output for management operations in the target system.

The method of FIG. 3B concerns more detailed example relating to processing of a data sample that has been identified to be an anomalous sample. The method of FIG. 3B may be referred to as an exhaustive algorithm. The method of FIG. 3B comprises following phases:

Phase 303: Processing of the data sample is started.

Phase 312: Certain variable combinations of the data sample are separately imputed using an imputation model. The imputation model is applied to a plurality of selected subsets of variables of the data sample. In this way, one obtains a plurality of imputed samples comprising imputed variable combinations.

The subsets of the variables or the variable combinations of interest may be preselected based on the target system. Based on knowledge of prior behavior of the target system it may be for example known that a first set of variables are interrelated so that most of them usually exhibit anomalous behavior if one of the variables of the first set exhibits anomalous behavior. In such case, the variables of the first set may be predefined as a variable combination of interest. Number of variables in each variable combination depends on the target system. There may be for example 3-10 variables in a variable combination. By using predefined variable combinations, it is achieved that there is no need to iterate through all possible variable combinations. This is a benefit as iterating through all possible combinations may be infeasible if the number of variables in the data sample is large.

Phase 313: The anomaly detection model is applied to the imputed samples to obtain respective anomaly scores.

Phase 314: The imputed sample that yields the lowest anomaly score is selected and the respective imputed variables of the selected imputed sample are chosen as the anomalous variables of the data sample.

Phase 305: The anomalous variables of the data sample are output for management operations in the target system the same way as in FIG. 3A.

The method of FIG. 3C concerns another more detailed example relating to processing of a data sample that has been identified to be an anomalous sample. The method of FIG. 3C may be referred to as a greedy algorithm. The method of FIG. 3C comprises following phases:

Phase 303: Processing of the data sample is started.

Phase 322: Individual variables of the data sample are separately imputed using the imputation model. In this way, a plurality of imputed samples each comprising an imputed variable are obtained.

Phase 323: The anomaly detection model is applied to the imputed samples to obtain respective anomaly scores.

Phase 324: The imputed sample with lowest anomaly score is selected and the value of an associated imputed variable is frozen.

Phase 325: The phases 322-324 are repeated for the variables with unfrozen values until anomaly score of the selected imputed sample ceases to indicate anomaly. That is, the process is repeated until magnitude of the lowest anomaly score is for example below an anomaly threshold.

Phase 326: The variables whose value has been frozen in the process are chosen as the anomalous variables of the data sample.

Phase 305: The anomalous variables of the data sample are output for management operations in the target system.

In an embodiment of the invention, the methods of FIGS. 3B and 3C (the exhaustive and the greedy algorithms) may be combined so that they are interchangeably used in the same system. For example, if a relatively small sample of measurement results is analyzed, the system may be configured to use the exhaustive algorithm, while any larger samples are analyzed using the greedy algorithm. In another alternative, irrespective of the size of the sample, few likely variable combinations may be first checked with the exhaustive algorithm, and if results are not obtained, the analysis may be continued with the greedy algorithm.

Figure 4:
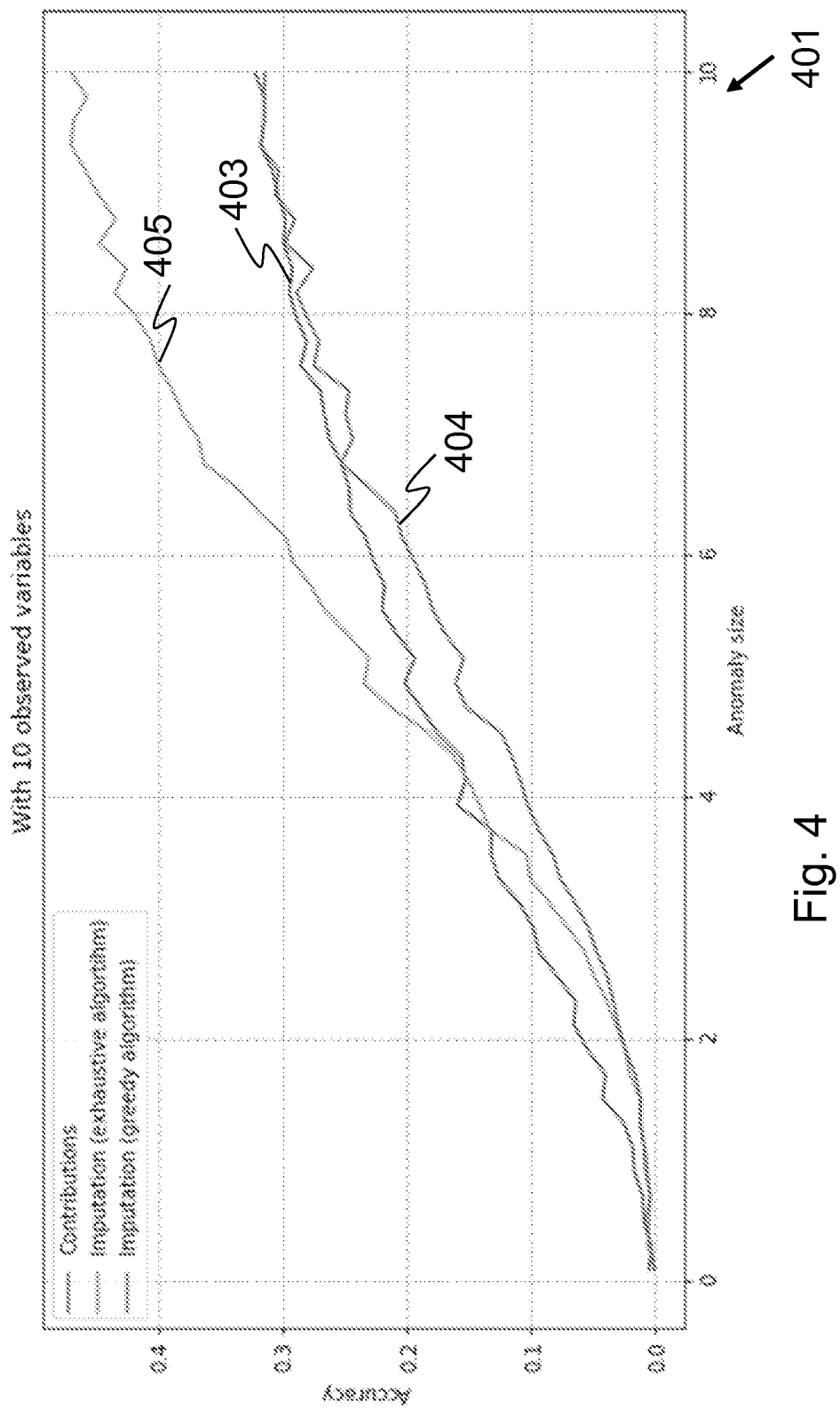
FIG. 4 shows results of an example simulation test.

FIG. 4 shows results of an example simulation test. The anomaly detection model in the example simulation is principal component analysis (PCA) model. PCA model transforms data into a lower-dimensional principal component space, and back to the original space. Anomaly score produced by the model is the squared norm of the difference between the original vector and its reconstruction. The imputation model in the example simulation is linear regression model. For each variable, a linear regression model is estimated to predict the missing variable using the other variables as predictors. A total of 10 variables are monitored in the example simulation and random anomalies are added to four randomly selected variables. Resulting anomaly size is the magnitude of the added deviation.

The graph 401 of FIG. 4 shows accuracy of the identification of the anomalous variables in y-axis and anomaly size in x-axis. Line 403 shows accuracy of the identification of the anomalous variables achieved by using a previously known contribution analysis method. Lines 404 and 405 show accuracy of the identification of the anomalous variables achieved by using embodiments of the invention. The line 404 shows performance of the greedy algorithm of the method of FIG. 3C and the line 405 shows performance of the exhaustive algorithm of the method of FIG. 3B.

It can be seen that as the anomaly size increases the performance of the exhaustive algorithm, line 405, shows better performance than the contribution analysis method. The greedy algorithm provides similar performance with the contribution analysis method. A benefit of both the greedy and the exhaustive algorithms is that they can be applied to any anomaly detection model, while the contribution analysis method is only applicable to the PCA model.

A benefit of the greedy algorithm is reduced computational intensity compared to the exhaustive algorithm. The greedy algorithm may not provide the accuracy of the exhaustive algorithm but the performance of the greedy is likely to suffice in many cases. If more accurate results are needed, the exhaustive algorithm can be used at the cost of increased computational intensity. Yet another alternative is to use combination of the greedy and the exhaustive algorithms.

In the following, some example use cases are discussed:

In a first example, multivariate time series data on batch manufacturing processes are analyzed. The anomaly detection model is trained based on data from multiple batches. The analysis according to embodiments of the invention then pinpoints variables that behave anomalously in comparison to the previously seen production batches. Management actions or changes in the manufacturing process may then be targeted based on this information.

In a second example, multivariate time series data on continuous production processes are analyzed. Anomaly detection is used to detect if the behavior of the process changes. The analysis according to embodiments of the invention then indicate the variables associated with the change, whereby appropriate adjustments may be made in the production process if the change is not desirable.

In a third example, data related to industrial processes is analyzed. In such case, each sample corresponds to an independent entity, such as an entire production run or a quality inspection action. The analysis according to embodiments of the invention may then indicate which part of the production run or the quality inspection action exhibit anomalous behavior. Management actions or changes in the industrial process may then be targeted based on this information.

In a fourth example, multivariate time series data on key performance indicators (KPI) relating to a communication network are analyzed. The analysis according to embodiments of the invention method can be used to pinpoint changes in the relationships between KPIs and to pinpoint the variables associated with those changes. Management actions or changes in the communication network may then be targeted based on this information.

In a fifth example, multivariate time series data on performance metrics of a cluster of cells in a communication network are analyzed. The cluster may correspond to a geographical area, for example. The analysis according to embodiments of the invention method can be used to pinpoint changes in the relationships between the metrics and to pinpoint the cells and metrics thereof associated with those changes. Management actions or changes in the communication network may then be targeted based on this information.

Without in any way limiting the scope, interpretation, or application of the claims appearing below, a technical effect of one or more of the example embodiments disclosed herein is ability to obtain information about variables that exhibit anomalous behavior in an anomalous data sample. Another technical effect of one or more of the example embodiments disclosed herein is ability automatically analyze large data samples that would be impractical to analyze manually. Yet another technical effect of one or more of the example embodiments is a universally applicable analysis method that does not depend on the anomaly detection model that is being used.

Another technical effect of one or more of the example embodiments disclosed herein is ability to systematically and timely obtain knowledge of variables that exhibit anomalous behavior in an anomalous data sample of a target system, whereby management of the target system can be improved. In this way educated actions can be taken in management of industrial processes and/or in management of communication networks. Additionally, targeting of the action can be improved. As management actions may be improved, one may be able to save resources.

If desired, the different functions discussed herein may be performed in a different order and/or concurrently with each other. Furthermore, if desired, one or more of the before-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the foregoing describes example embodiments of the invention, these descriptions should not be viewed in a limiting sense. Rather, there are several variations and modifications, which may be made without departing from the scope of the present invention as defined in the appended claims.

The invention claimed is:

1. A computer implemented method of analyzing measurement results of a target system, the method comprising:
    receiving a data sample comprising a plurality of variables representing the measurement results,
    detecting that the data sample is an anomalous sample using an anomaly detection model,
    processing the data sample by separately applying an imputation model to a plurality of selected subsets of variables of the data sample to obtain a plurality of imputed samples, and applying the anomaly detection model to the imputed samples to obtain respective anomaly scores,
    determining anomalous variables of the data sample based on results from the processing of the data sample, and
    outputting the anomalous variables of the data sample for management operations in the target system.

2. The method of claim 1, wherein the target system is an industrial process.

3. The method of claim 2, wherein the measurement results comprise sensor data from the industrial process.

4. The method of claim 1, wherein the target system is a communication network.

5. The method of claim 4, wherein the measurement results comprise performance metrics from the communication network.

6. The method of claim 1, further comprising separately applying the imputation model to a plurality of selected subsets of variables of the data sample to obtain a plurality of imputed samples comprising imputed variables, applying the anomaly detection model to the imputed samples to obtain respective anomaly scores, selecting the imputed sample with lowest anomaly score, and choosing the imputed variables of the selected imputed sample as the anomalous variables of the data sample.

7. The method of claim 6, wherein the subsets of the variables are preselected based on the target system.

8. The method of claim 1, further comprising separately imputing individual variables of the data sample using the imputation model to obtain a plurality of imputed samples comprising an imputed variable, applying the anomaly detection model to the imputed samples to obtain respective anomaly scores, selecting the imputed sample with lowest anomaly score and freezing value of an associated imputed variable, repeating the imputing, applying and selecting phases for the variables with unfrozen values until anomaly score of the selected imputed sample ceases to indicate anomaly; and choosing the variables with a frozen value as the anomalous variables of the data sample.

9. An apparatus comprising a processor, and a memory including computer program code; the memory and the computer program code configured to, with the processor, cause the apparatus to perform:

receiving a data sample comprising a plurality of variables representing the measurement results, detecting that the data sample is an anomalous sample using an anomaly detection model, processing the data sample by separately applying an imputation model to a plurality of selected subsets of variables of the data sample to obtain a plurality of imputed samples, and applying the anomaly detection model to the imputed samples to obtain respective anomaly scores, determining anomalous variables of the data sample based on results from the processing of the data sample, and outputting the anomalous variables of the data sample for management operations in the target system.

10. A non-transitory memory medium comprising computer executable program code which when executed by a processor causes an apparatus to perform:

receiving a data sample comprising a plurality of variables representing the measurement results, detecting that the data sample is an anomalous sample using an anomaly detection model, processing the data sample by separately applying an imputation model to a plurality of selected subsets of variables of the data sample to obtain a plurality of imputed samples, and applying the anomaly detection model to the imputed samples to obtain respective anomaly scores, determining anomalous variables of the data sample based on results from the processing of the data sample, and outputting the anomalous variables of the data sample for management operations in the target system.

* * * * *